United States Patent
Zhao

(10) Patent No.: US 7,457,275 B2
(45) Date of Patent: Nov. 25, 2008

(54) METHOD FOR IMPLEMENTING IU-FLEX BASED MBMS

(76) Inventor: Jianguo Zhao, Huawei Service Centre Building, Kefa Rd., Science-Based Industrial Park, Shenzhen City, Guangdong Province, 518057 (CN)

( * ) Notice: Subject to any disclaimer, the term of this patent is extended or adjusted under 35 U.S.C. 154(b) by 927 days.

(21) Appl. No.: 10/390,341

(22) Filed: Mar. 17, 2003

(65) Prior Publication Data

US 2003/0189914 A1    Oct. 9, 2003

(51) Int. Cl.
| | |
|---|---|
| H04B 7/216 | (2006.01) |
| H04L 12/28 | (2006.01) |
| H04L 12/56 | (2006.01) |
| H04J 3/26 | (2006.01) |
| H04B 7/00 | (2006.01) |
| H04B 7/26 | (2006.01) |

(52) U.S. Cl. .................. 370/342; 370/390; 370/432; 455/524; 455/525

(58) Field of Classification Search .......... 370/270, 370/352, 401, 465, 390, 432; 455/524, 525
See application file for complete search history.

(56) References Cited

U.S. PATENT DOCUMENTS

| | | | | |
|---|---|---|---|---|
| 6,621,793 | B2 * | 9/2003 | Widegren et al. | 370/230.1 |
| 6,661,780 | B2 * | 12/2003 | Li | 370/324 |
| 7,006,478 | B1 * | 2/2006 | Mizell et al. | 370/338 |
| 7,058,042 | B2 * | 6/2006 | Bontempi et al. | 370/338 |

(Continued)

FOREIGN PATENT DOCUMENTS

CN    WO 2004/043021 A1 *    5/2004

(Continued)

OTHER PUBLICATIONS

"3rd Generation Partnership Project; Technical Specification Group Services and System Aspects; Multimedia Broadcast/Multicast Service; Architecture and Functional Description (Release 5)" 3GPP TR 23.846 0.3.0, Apr. 2, 2002, pp. 1-20, XP002249708.

(Continued)

*Primary Examiner*—Edan Orgad
*Assistant Examiner*—Blanche Wong
(74) *Attorney, Agent, or Firm*—Edwards Angell Palmer & Dodge LLP; Kathleen Williams; Matthew Beaudet

(57) ABSTRACT

A method is provided for implementing Iu-Flex-Based MBMS. A SGSN sends an RAB request to an RNC. The RNC establishes a corresponding RAB for the multicast traffic according to the request and the SGSN sending the request. At the same time, if the RNC detects that a plurality of multicast traffics from other SGSNs correspond to a multicast traffic, the RNC will choose an SGSN as the primary SGSN, take the RAB between the primary SGSN and itself as the primary path to receive the multicast traffic, and maintain the connections to other SGSN. Transmission of the multicast traffic is then performed through the primary SGSN, during the multicast traffic transmission process. The RNC may change the primary SGSN when necessary, receive multicast traffic through the RAB of the new primary SGSN, and maintain the connections to other SGSNs. In this method, multicast traffics can be implemented simply and reliably. The method also helps to reduce consumption of network resources and improve network security and accounting management.

9 Claims, 5 Drawing Sheets

U.S. PATENT DOCUMENTS

| | | | |
|---|---|---|---|
| 7,107,066 B2 * | 9/2006 | Toth et al. | 455/458 |
| 7,146,419 B1 * | 12/2006 | O'Rourke et al. | 709/224 |
| 7,162,241 B2 * | 1/2007 | Kim et al. | 455/435.2 |
| 2003/0152098 A1 * | 8/2003 | Zhu | 370/432 |
| 2004/0022218 A1 * | 2/2004 | Kim et al. | 370/335 |
| 2004/0081192 A1 * | 4/2004 | Koulakiotis et al. | 370/432 |
| 2005/0083913 A1 * | 4/2005 | Choi et al. | 370/352 |

FOREIGN PATENT DOCUMENTS

| | | | |
|---|---|---|---|
| CN | WO 2004/043024 A1 * | 5/2004 | |

OTHER PUBLICATIONS

Universal Mobile Telecommunication System (UMTS); Multimedia Broadcast/Multicast Service (MBMS); Stage 1 (3GPP TS 22.146 version 5.3.0 Release 5) Mar. 1, 2002, pp. 1-15.

"3rd Generation Partnership Project; Technical Specification Group Services and System Aspects; Multimedia Broadcast/Multicast Service; Architecture and Functional Description (Release 6)" 3GPP TR 23.846 2.0 0, Sep. 8 2002, pp. 1-114.

* cited by examiner

METHOD FOR IMPLEMENTING IU-FLEX BASED MBMS

RELATED APPLICATIONS

This applications claims priority under 35 U.S.C. § 119 to Chinese Application No.: 02116572.6, filed Apr. 9, 2002, the content of which is hereby expressly incorporated herein by reference in its entirety.

FIELD OF THE INVENTION

The present invention relates to a method for implementing MBMS in wireless communication systems, particularly to a method for implementing Iu-Flex-based MBMS.

BACKGROUND OF THE INVENTION

Multicast is a method for sending data from a source to many destinations. With multicast, the same data can be sent to many subscribers by sending only once, thus network resources can be saved. According to the 3GPP ($3^{rd}$ Generation Partnership Project) standard, a node in a wireless access network can be connected to a plurality of central network nodes with Iu-Flex technology. For example, a General Packet Radio Services (GPRS) Radio Network Controller (RNC) or Universal Mobile Telecommunication System (UMTS) Base Station Controller (BSC) can be connected to a plurality of Serving GPRS Support Nodes (SGSN). In this way, when MBMS (Multimedia Broadcast/Multicast Service) is implemented in an Iu-Flex-based network environment, MBMS traffic may be sent from a plurality of SGSNs to the same RNC, which results in a waste of network bandwidth resources. In order to solve this problem, many methods have been proposed for implementing MBMS in Iu-Flex-based network environments.

The first method utilizes a default SGSN, i.e., during the process of activating or relocating/switching multicast traffic, the RNC determines whether to establish multicast traffic or to insert the multicast traffic into an existing multicast traffic. To ensure that the RNC receives multicast data from only one SGSN, the RNC appoints a "Default SGSN", which is used to establish a multicast traffic channel in advance. At the same time, the RNC establishes an RAB link to the SGSNs where the subscribers are registered to maintain the signal connections. However, the method may result in difficulty in traffic-based accounting, because the SGSNs where the subscribers are registered don't "know" the data volume transmitted through the "default SGSN".

The second method is to bypass the SGSNs. In this method, SGSNs participate in the alternation of multicast signals, but the GGSNs send multicast data directly to the RNC without the participation of the SGSNs. Because the RNC can connect with the GGSNs, the internal structure of the network will be disclosed when subscribers roam between the GGSNs and the SGSNs, which will result in network security problems. At the same time, the method may also result in difficulty in traffic-based accounting because the SGSNs where the subscribers are registered don't "know" the data volume transmitted through the "default SGSN".

The third method is to let the RNC choose one from multicast traffics. In this method, the RNC keeps receiving a data stream from SGSNs, but chooses one of them and forwards it to multicast subscribers. A disadvantage of this method is network resources cannot be utilized effectively.

The fourth method is to let the RNC use a single connection to one of the SGSNs. In this method, when the MBMS data transmission begins and the RNC detects sending requests from many SGSNs, the RNC will establish connections to individual SGSNs but only establish a multicast RAB to one of the SGSNs, and no TAB is established between RNC and other SGSNs, but other SGSNs can receive multicast data from GGSNs and create traffic-based accounting information for specific subscribers. In an Iu-Flex-based network environment, even though a plurality of subscribers in the same multicast subscriber group are connected to the same RNC, they may be served by a plurality of SGSNs simultaneously. In this case, the MBMS message parameters at the SGSNs should be identical. However, synchronization among SGSNs and parameter consistency for the MBMS will increase the complexity of control and degrade the processing efficiency.

SUMMARY OF THE INVENTION

The present invention provides a simple and reliable method for implementing Iu-Flex-Based MBMS, which reduces the consumption of network resources and contributes to network security and accounting management.

To attain this object, a method is provided for implementing an Iu-Flex-Based MBMS: An SGSN sends an RAB request to the RNC, and the RNC establishes a corresponding RAB for the multicast traffic and the SGSN sending the request according to the request. The RNC detects whether there are a plurality of multicast traffics, from other SGSNs, corresponding to a multicast traffic. If there are, the RNC chooses an SGSN as the primary SGSN, and takes the RAB between the primary SGSN and the RNC as the primary path to receive the multicast traffic and maintains connections to secondary SGSNs (other SGSNs). The multicast traffic is transmitted through the primary SGSNs.

The transmission of the multicast traffic transmission through the primary SGSNs further comprises several acts. The RNC determines whether to change the primary SGSN. If the primary SGSN is to be charged, an SGSN is chosen from SGSNs as the primary SGSN, and multicast data is then received through the RAB between the new primary SGSN and the RNC. The connections to the secondary SGSNs are maintained.

The RAB connections maintained between the RNC and the secondary SGSNs are implemented through sending minimum data stream or zero data stream from the secondary SGSNs to the RNC.

The changing of the primary SGSN by the RNC may be performed when the network requires releasing the RAB between the RNC and the primary SGSN.

The changing of the primary SGSN by the RNC may also be performed when an SGSN that hasn't established a RAB connection to the RNC initiates an RAB request.

The choosing one of the SGSNs as the primary SGSN will be performed according to the precedence of multicast data packets received by the RNC through RABs to SGSNs, the quality of the transmission links, the load on the transmission links, the precedence of establishing links, and the QoS requirements of SGSNs for the multicast traffic.

Before the RNC determines the primary SGSN, it consults with the SGSNs for the QoS requirements of the multicast RAB to ensure the multicast RAB of the primary receiving path satisfies the requirements of all primary SGSNs and secondary SGSNs.

If the amount of data packets received by a secondary SGSN from a GGSN doesn't exceed the restriction of the RNC, the SGSN will not forward the data packets received from the GGSN to the RNC or forward compressed messages to the RNC, and it will deem the RNC to already have received the multicast data.

If a secondary SGSN forwards only compressed messages to the RNC or doesn't forward multicast data packets, the RNC sends the statistical information about the multicast data packets received from the primary SGSN to the primary SGSN and to the secondary SGSNs.

The RNC chooses one of the SGSNs as the primary SGSN, and takes the RAB between the primary and itself as the primary path for receiving the multicast traffic. The RCN takes other SGSNs as secondary SGSNs and maintain the RAB connections to the secondary SGSNs. In comparison to the first method described above, this method will not result in difficulty in accounting management because the RNC takes other SGSNs as secondary SGSNs and maintains the RAB connections to the secondary SGSNs. In comparison to the second method, the present method will not result in network security problems and facilitates traffic-based accounting, because there is no need to disclose the internal structure of the network when transmitting multicast traffics. In comparison to the third method, the method reduces waste of transmission resources because it mainly utilizes the primary SGSN to distribute multicast data. In comparison to the fourth method, this method will not result in any inconsistency of multicast parameters among SGSNs, thus the system can be implemented easily and reliably. Hence this method not only reduces consumption of network resources but also makes the multicast services simple and reliable, and improves network security and accounting management.

DESCRIPTION OF THE DRAWINGS

The present invention is described in further detail according to the drawings and the following embodiment.

Figure 2:
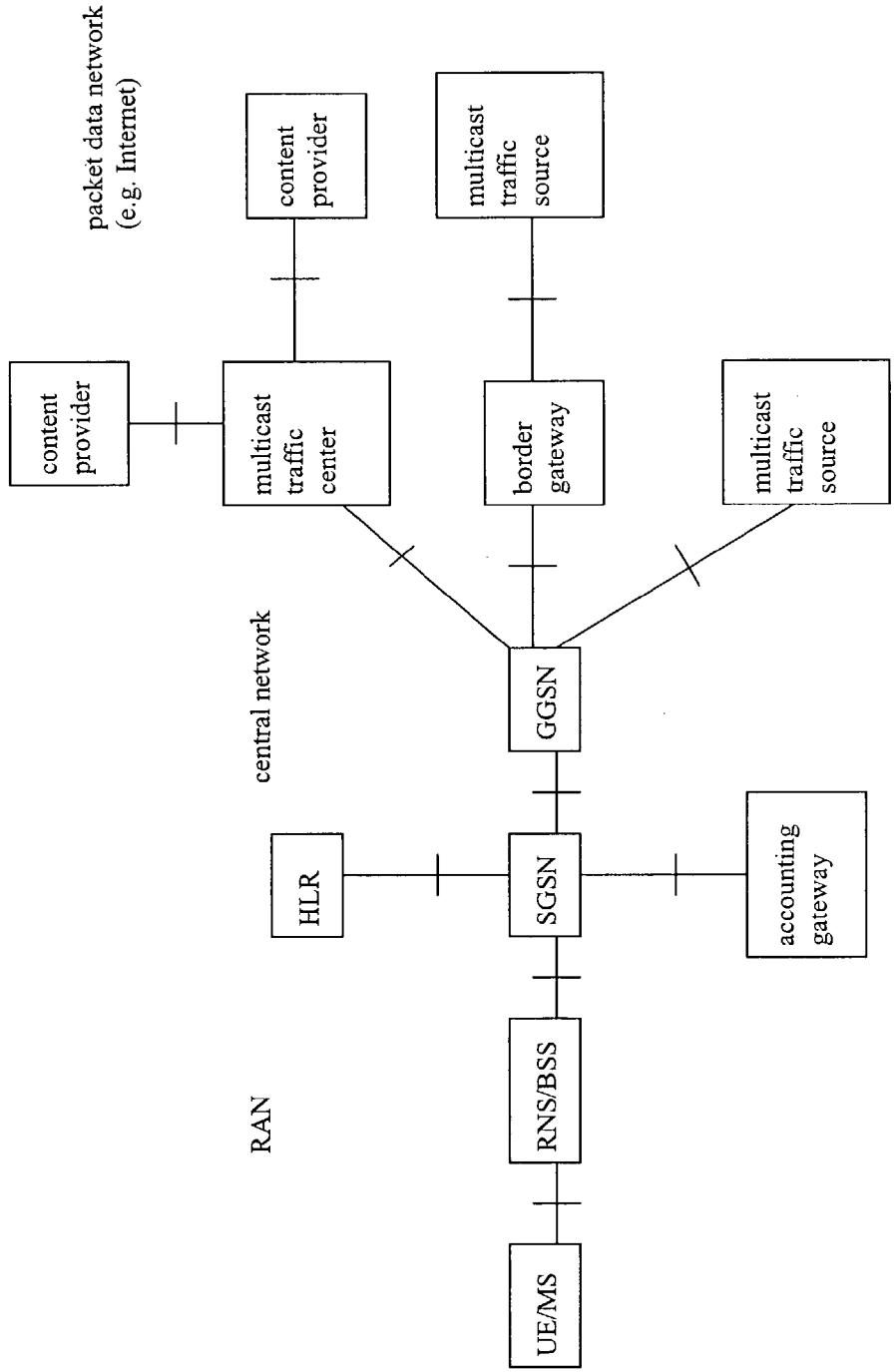
FIG. 2 is a schematic diagram of an embodiment universal mobile telecommunication system in present invention.

FIG. 2 is a schematic diagram of a universal mobile telecommunication system in one embodiment of the present invention. The illustration shows an RAN (a Radio Access Network), a Central Network, and a Packet Data Network. According to FIG. 2, User Equipment (UE) is a generic term for mobile terminals in a UMTS network. Mobile station (MS) is a generic term for mobile terminals in a GPRS network; similarly, Radio Network System (RNS) and Base Station System (BSS) are wireless access network parts of UMTS and GPRS networks, respectively. SGSNs (Serving GPRS Support Nodes) perform various service control and mobility management functions for multicast traffics and forward multicast data from GGSNs (Gateway GPRS Support Node) to relevant RNSs or BSSs. GGSNs are responsible for contacting internal/external multicast traffic sources and forward multicast data from multicast traffic sources to SGSNs. A multicast traffic center is also a multicast traffic source. Different from other multicast traffic sources, the multicast service center can arrange and manage multicast data from content providers as well as deliver authentication and accounting services for content providers. The border gateway controls data transmission from external networks. For example, the border gateway regulates that only the data from a certain specific address or some specific ports is allowed to enter the mobile network. The accounting gateway is responsible for collecting multicast accounting records, processing them, and then sending the processed records to the accounting center. Home Location Registers (HLRs) store registration information and route information for registered multicast subscribers. Content providers send multicast data for broadcasting multicast traffic to the multicast traffic center, which distributes the multicast data to an individual GGSN. GGSNs send the multicast data to SGSNs via established multicast links. SGSNs send the multicast data to multicast subscribers via appropriate wireless links (e.g., point-to-point links or point-to-multipoint links) in the wireless access networks.

Figure 1:
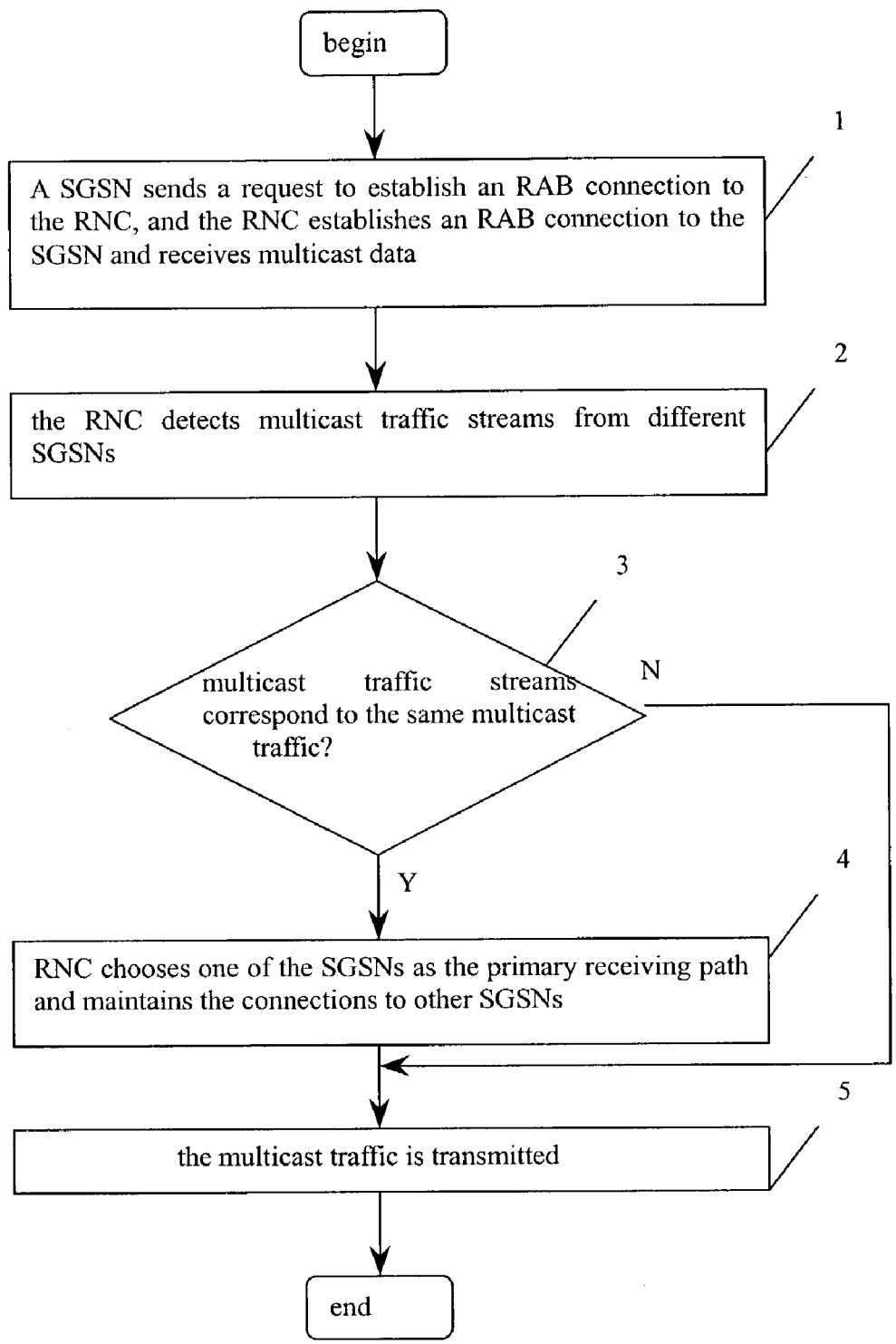
FIG. 1 is a flowchart of an embodiment of a method in the present invention.

FIG. 1 shows an embodiment of a detailed implementation process of the present invention in an Iu-Flex-based network environment. According to FIG. 1, when implementing multicast traffic, in act 1, a SGSN sends a request to establish an RAB connection for the multicast traffic to an RNC. The RNC establishes a corresponding multicast RAB to the SGSN according to the request, and receives a multicast data stream from the SGSN. During the receiving process, in act 2, the RNC detects multicast traffic from other SGSNs connected to it. Then in act 3, the RNC determines whether different multicast traffic correspond to the same multicast service. If the RNC finds that different multicast traffic does not correspond to the same multicast service, the process proceeds to act 5 to continue transmitting multicast data; if the RNC finds that many multicast traffics correspond to the same multicast service, the process proceeds to act 4. In act 4, the RNC chooses one from the SGSNs as the primary SGSN, and takes the RAB between the primary SGSN and itself as the primary path; at the same time, it takes other SGSNs as secondary SGSNs and maintains the RAB connections to them. Only a minimum data stream or zero data stream will be sent from the secondary SGSNs to maintain the connections between the RNC and the secondary SGSNs.

Figure 3:
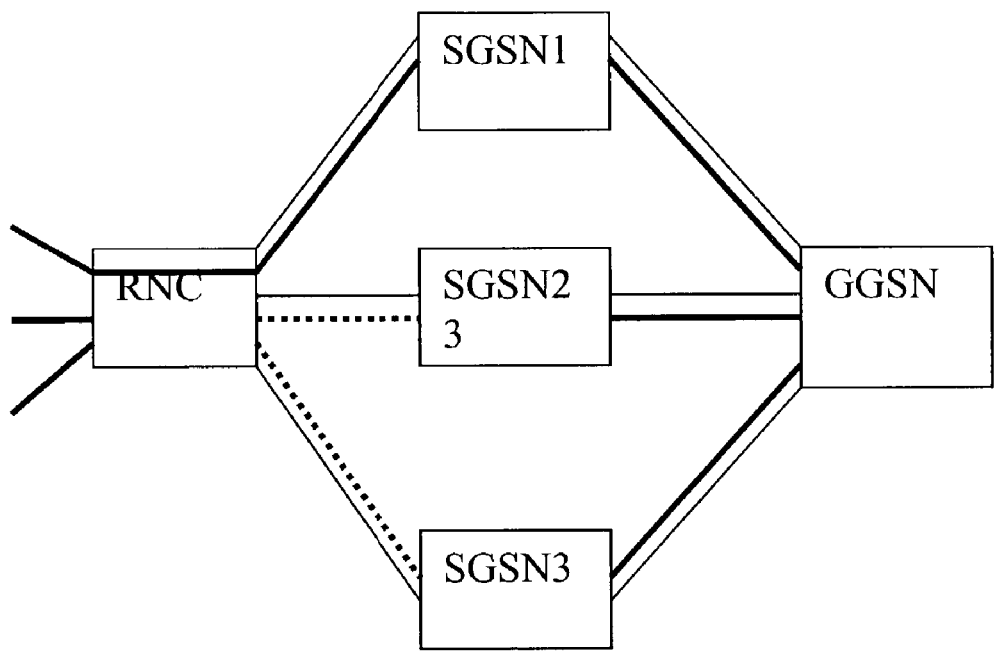
FIG. 3 is a schematic diagram of the RNC connection in the present invention.

The principle of multicast data transmission paths can be described with reference to FIG. 3, wherein the narrow solid lines represent instruction transmission links, the thick solid lines represent the primary RAB links and multicast data dreams, and the dotted lines represent secondary RAB links.

In order to minimize the amount of data packets sent from SGSNs to the RNC, the following modes can be used for secondary SGSNs:

1). The RNC consults a limitation criterion with secondary SGSNs. Within the limitation, secondary SGSNs stop forwarding multicast data packets to the RNC. When the limitation is exceeded, the secondary SGSNs will send actual multicast data packets to the RNC again. After that, the RNC and the secondary SGSNs may consult again to determine a new limitation criterion, which may be a requirement for time, the limitation on data volume, or the requirement for the service environment (e.g., QoS), etc. For example, the data packets are less than 10,000 IP packets within 1 hour. If there is no limitation on time and data volume, the secondary SGSNs will not forward multicast data packets to the RNC.

2). When secondary SGSNs send multicast data to the RNC, they only send compressed messages. After receiving the compressed messages, the RNC may determine the continuity, integrity, and correctness of the multicast data stream.

3). Combining with method 1) and method 2), the RNC consults a limitation criterion with the secondary SGSNs. Within the limitation, secondary SGSNs send compressed messages related with multicast data packets. When the limitation is exceeded, the secondary SGSNs send actual multicast data packets to the RNC again. After that, the RNC and the secondary SGSNs may consult again to determine a new limitation criterion, which may be a requirement for time, the limitation on data volume, or the requirement for the service environment (e.g., QoS), etc.

4). The RNC consults with the secondary SGSNs to determine a specific time or the amount of data packets as the handshake periodicity, which may also be configured by the operator. Secondary SGSNs don't send multicast data to the RNC normally. However, they send a few multicast data packets or compressed multicast data packets or RAB state information to the RNC every certain time and/or certain amount of data packets, in order to maintain the RAB connections to the RNC.

It should be noted that the modes from 1) to 4) can be used in alternation or in combination.

During the multicast traffic transmission process in act 5, the RNC will also determine whether to change the primary SGSN. If it will, it will choose one of the secondary SGSNs as the primary SGSN. Then the RNC receives multicast data through the RAB between the new primary SGSN and itself, and maintains the connections to secondary SGSNs at the same time.

Changing the primary SGSN by the RNC may be performed when the primary RAB between the RNC and the primary SGSNs has to be released due to some reasons (e.g., multicast subscribers log off or switch or links fail). That is to say, the RNC chooses a path from the secondary SGSNs as the new receiving path, informs the new primary SGSN to send multicast data, and maintains the connection to the other secondary SGSNs at the same time.

Changing the primary SGSN by the RNC may also be performed when an SGSN that has not established a RAB connection to the RNC initiates an RAB request to the RNC. When a new SGSN initiates an RAB request to the RNC, the operation state of the network may vary, for example, the load on the original primary RAB link may be no longer optimal. In this case, the primary SGSN and the primary RAB should be changed. Thus the RNC may deprive the primary RAB of its qualification and promote a secondary to the primary RAB, and the RNC will receive multicast data from the new primary RAB.

The basis for the RNC's choosing a receiving path may be a random selection or a deliberate selection of the RNC from the secondary SGSNs in terms of the precedence of receiving paths, the quality of transmission links, the load on transmission links, the precedence of RAB establishment, and requirements of SGSNs for multicast QoS, etc.

Before the RNC determines the primary receiving path, it should consult or reconsult the QoS requirement of Multicast RAB with the individual SGSN, in order to ensure that the multicast RAB on the primary receiving path can satisfy all requirements of the primary SGSN and secondary SGSNs.

During the transmission process of multicast data, a secondary SGSN doesn't forward the data packets, or only forwards compressed messages if the amount of data packets received from a GGSN by the SGSN. In addition, it deems that the RNC has already received the multicast data. On this basis, the SGSN calculates the multicast traffic flow forwarded to multicast subscribers. The compressed messages are very short messages, such as summary information of multicast data packets, IP packet heads, packet numbers of multicast data packets, or a packet number list, etc. The object of sending compressed messages from the SGSNs to the RNC continuously is to maintain the connection between them as well as reduce the total data stream. When the secondary SGSNs don't send multicast data packets or only send compressed messages to the RNC, the RNC may send the statistical information about the multicast data packets received from the primary SGSN to the primary SGSN and individual secondary SGSN, e.g., the multicast traffic volume received from the primary SGSN and the multicast traffic volume sent via air interface, etc.

An embodiment of the present invention is described in further detail through the process of establishing a multicast RAB and the process of changing the multicast RAB.

Figure 4:
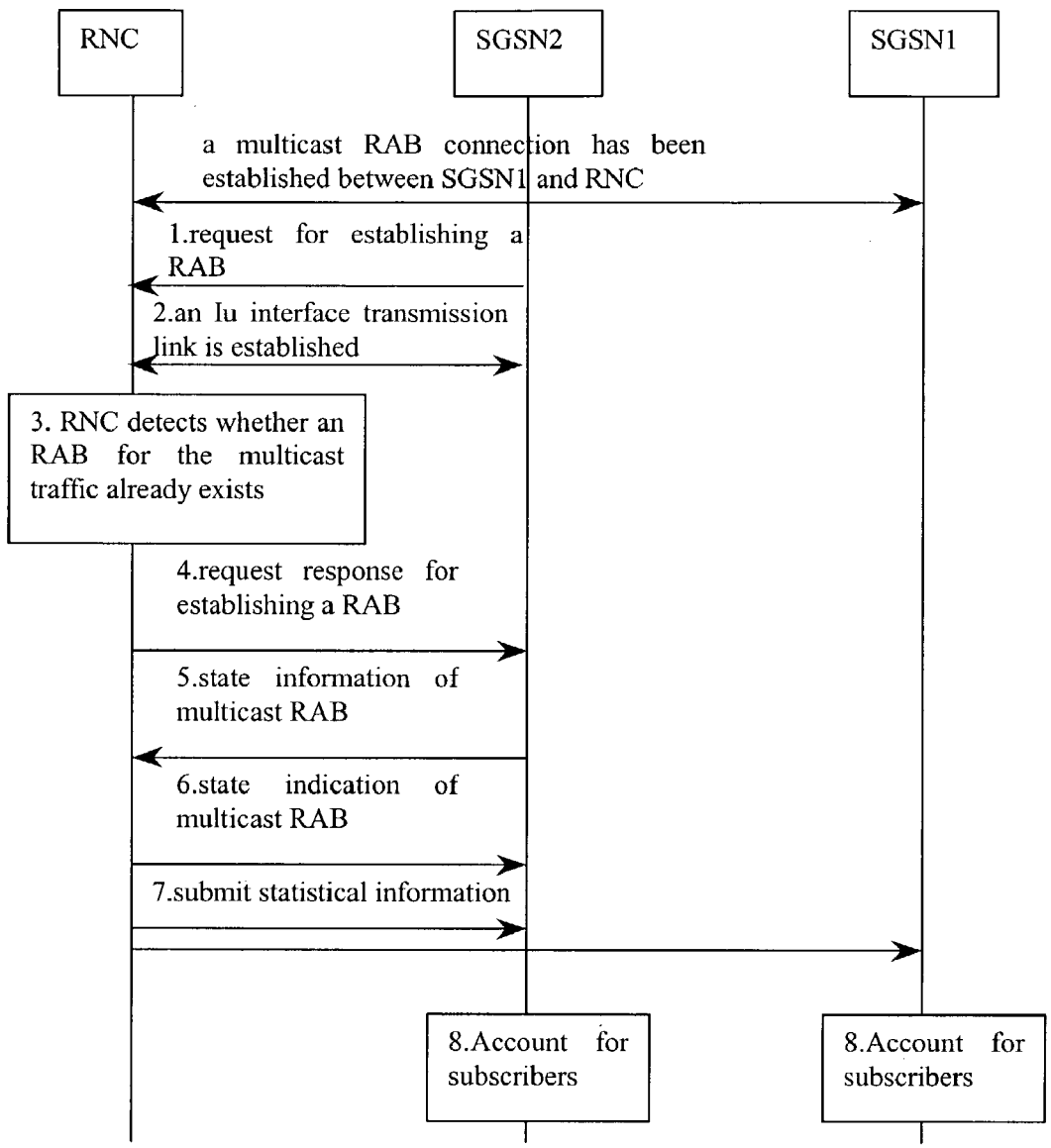
FIG. 4 is a flowchart of a process for establishing a multicast RAB.

FIG. 4 is a flowchart of a process for establishing the multicast RAB. In FIG. 4, the RNC has established a RAB connection for multicast traffic A to SGSN1. At this time, SGSN2 requests establishing a new RAB connection for multicast traffic A to the RNC. The acts are described as follows:

In act 11, SGSN2 initiates a request to establish an RAB connection to the RNC, and the request message includes the QoS requirements for multicast traffic A, an identifier identifying multicast traffic A for the access network, Iu interface parameters, etc.

In act 12, the RNC receives the RAB establishing the request, and establishes an In interface transmission link to SGSN2.

In act 13, the RNC verifies the RAB connection for multicast traffic A to SGSN1 according to the identifier of multicast traffic A, and then determines whether to change the primary SGSN; suppose the primary SGSN is determined not to change, the RNC will proceed to act 14.

In act 14, the RNC sends a response to the RAB establishing a request to SGSN2 to indicate that the multicast RAB has been established and to indicate that there is no need to forward the multicast data through the Iu connection. The response message comprises: configuration of QoS parameters for multicast traffic A, In interface parameters, multicast data forwarding information (e.g., handshake time interval Δt, format of compressed messages, etc.).

In act 15, SGSN2 sends a state message to RNC once every Δt. The state message comprises: the amount of multicast data packets not forwarded to the RNC by SGSN, the serial number of the current data packet waiting to be sent to the RNC, etc.

In act 16, the RNC verifies whether the state information sent by SGSN2 is consistent with the information of multicast traffic A. If not, the RNC reports its current state to SGSN2; if yes, the RNC sends a state instruct and informs SGSN2 of keeping current state.

In act 17, the RNC sends statistical information to SGSN1 and SGSN2 at the interval of specific time to report the volume of multicast data received from SGSN1 and SGSN2 respectively and the volume of multicast data sent via the air interface.

In act 18, SGSN1 and SGSN2 perform accounting for multicast subscribers according to the volume of multicast data, QoS, and other information.

Figure 5:
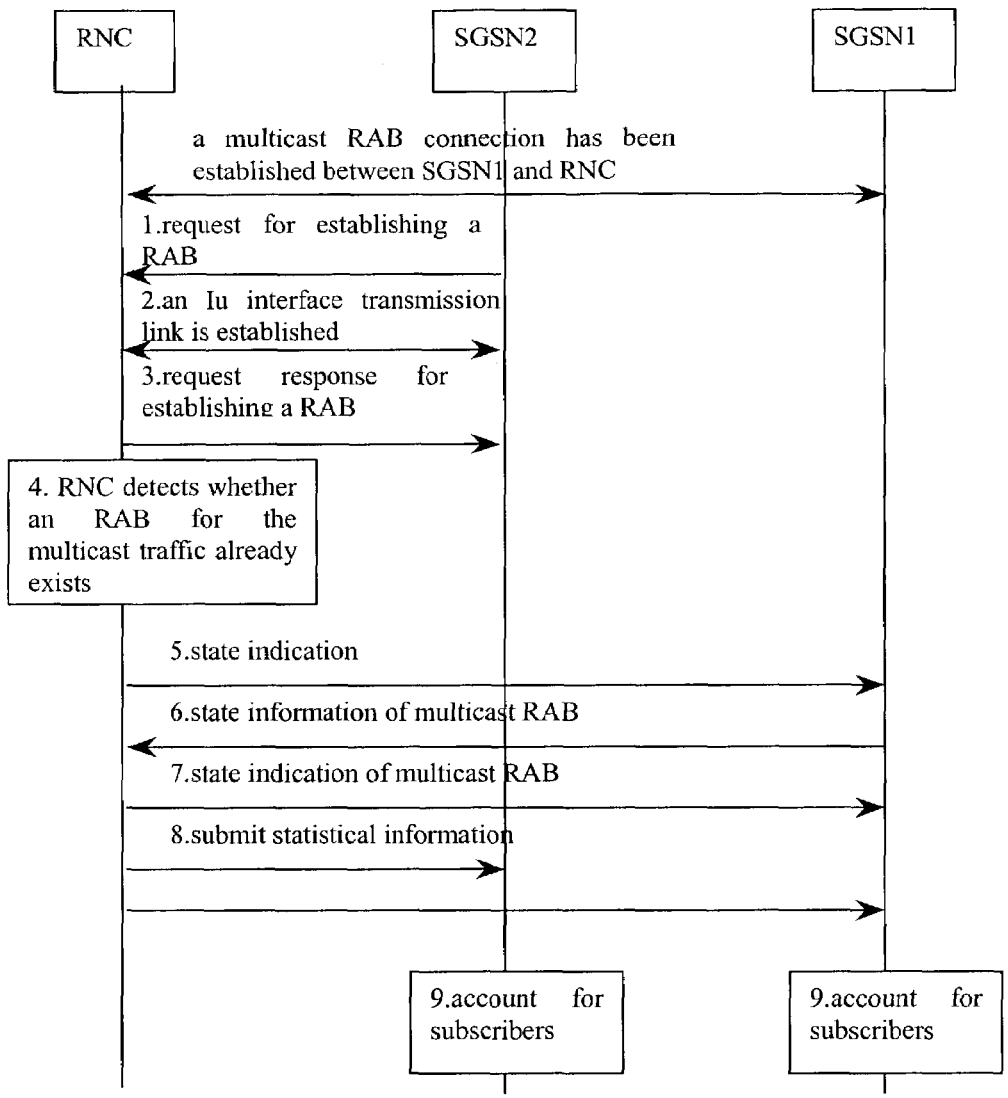
FIG. 5 is a flowchart of a process for changing a multicast RAB.

FIG. 5 is a flowchart of a process for changing the multicast RAB, wherein the RNC has established an RAB connection for multicast traffic A to SGSN1. At this time, SGSN2 requests establishing a new RAB connection for multicast traffic A to the RNC. The acts are described as follows:

In act 21, SGSN2 initiates a request for establishing a RAB connection to the RNC, and the request message includes the QoS requirements for multicast traffic A, an identifier identifying multicast traffic A for the access network, Iu interface transmission link parameters, etc.

In act 22, the RNC receives the RAB establishing request and establishes an Iu interface transmission link to SGSN2.

In act 23, the RNC sends a response to the RAB establishing a request to SGSN2 to indicate the multicast RAB has been established. The response message comprises: configuration of QoS parameters for multicast traffic A, Iu interface parameters, etc.

In act 24, the RNC verifies the RAB connection for multicast traffic A to SGSN1 according to the identifier of multicast traffic A, and then determines whether to change the primary SGSN; suppose the primary SGSN is determined to change, the RNC chooses SGSN2 as the primary SGSN and the RAB to SGSN2 as the primary receiving path, then process to step 25.

In act 25, the RNC receives multicast data from SGSN2, and it indicates SGSN1 not to forward the multicast data. The indication message comprises: multicast data forwarding information (e.g., handshake time interval $\Delta t$, format of compressed messages, etc.).

In act 26, SGSN1 sends a compressed message for current multicast data packet to RNC once every $\Delta t$. The compressed message comprises: IP packet heads and serial numbers of the current IP multicast data packets, etc.

In act 27, the RNC verifies whether the state information sent by SGSN1 is consistent to the information of multicast traffic A. If not, the RNC reports the current state of itself to SGSN2; if yes, the RNC sends a state instruct and informs SGSN2 of keeping current state.

In act 28, the RNC sends statistical information to SGSN1 and SGSN2 at the interval of specific time to report the volume of multicast data received from SGSN1 and SGSN2 respectively and the volume of multicast data sent via the air interface.

In act 29, SGSN1 and SGSN2 perform accounting for multicast subscribers according to volume of multicast data, QoS, and other information.

What is claimed is:

1. A method for implementing a Multimedia Broadcast/Multicast Service (MBMS) in a network environment having an intra-domain connection of Radio Access Network (RAN) nodes to multiple Core Network (CN) nodes, the method comprising:

sending a request to establish a Radio Access Bearer (RAB) connection for multicast traffic from each of a plurality of Serving GPRS (General Packet Radio Services) Support Nodes (SGSNs) to a Radio Network Controller (RNC);

establishing a RAB connection for multicast traffic between the RNC and each of the SGSNs according to the request;

detecting by the RNC whether multicast traffic from more than one of the SGSNs corresponds to the same multicast service; if yes choosing one of the SGSNs as a primary SGSN, deeming the RAB connection between the primary SGSN and the RNC as a primary path to receive the multicast traffic, deeming the remaining SGSNs as secondary SGSNs, and maintaining RAB connections between the secondary SGSNs and the RNC by sending a minimum data volume or zero data volume from the secondary SGSNs to the RNC; and transmitting the multicast traffic to the RNC through the primary SGSN.

2. The method of claim 1, wherein the transmitting the multicast traffic to the RNC through the primary SGSN comprises: determining by the RNC whether to change the primary SGSN; and if the RNC determines that the primary SGSN is to be changed, choosing one of the secondary SGSNs as a primary SGSN, receiving the multicast traffic through the RAB connection between the chosen primary SGSN and the RNC; and maintaining RAB connections between the secondary SGSNs and the RNC.

3. The method of claim 2, wherein if the primary SGSN needs to be changed, the changing is performed when a network requires releasing the RAB connection between the RNC and the primary SGSN.

4. The method of claim 3, wherein the choosing one of the secondary SGSNs as the primary SGSN is performed according to factors including an order of precedence of multicast traffic received by the RNC through RAB connections between the RNC and the secondary SGSNs, a quality of transmission links, a load on transmission links, an order of precedence of transmission links established, QoS requirements of the primary and the secondary SGSNs for the multicast service.

5. The method of claim 4, before determining whether to change the primary SGSN, the method further comprises: consulting by the RNC with the primary and the secondary SGSNs for QoS requirements for the multicast traffic to ensure the multicast RAB connection of the primary path to satisfy the QoS requirements of the primary and the secondary SGSNs for the multicast service.

6. The method of claim 5, further comprising: when the multicast traffic received by a secondary SGSN from a Gateway GPRS Support Node (GGSN) does not exceed a restriction of the RNC, not forwarding the multicast traffic received from the GGSN to the RNC by the secondary SGSNs, or forwarding compressed messages to the RNC by the secondary SGSNs, and deeming by the secondary SGSN to have already received the multicast traffic at the RNC.

7. The method of claim 6, further comprising: sending a statistical message about the multicast traffic received from the primary SGSN to the primary SGSN and to the secondary SGSNs by the RNC.

8. The method of claim 2, wherein if the primary SGSN needs to be changed, the changing is performed when an SGSN that has not established an RAB connection to the RNC initiates a request to establish a RAB connection for multicast traffic.

9. The method of claim 8, wherein the choosing one of the secondary SGSNs as the primary SGSN is performed according to factors including an order of precedence of multicast traffic received by the RNC through RAB connections between the RNC and the secondary SGSNs, a quality of transmission links, a load on transmission links, an order of precedence of transmission links established, QoS requirements of the primary and the secondary SGSNs for the multicast service.

* * * * *